United States Patent
Brisebois et al.

(10) Patent No.: US 10,397,161 B2
(45) Date of Patent: Aug. 27, 2019

(54) ELECTRONIC MAIL (EMAIL) MESSAGE LIFECYCLE MANAGEMENT

(71) Applicant: QUEST SOFTWARE INC., Aliso Viejo, CA (US)

(72) Inventors: Michel Albert Brisebois, Renfrew (CA); Curtis Johnstone, Ottawa (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 225 days.

(21) Appl. No.: 15/154,062

(22) Filed: May 13, 2016

(65) Prior Publication Data
US 2017/0331777 A1    Nov. 16, 2017

(51) Int. Cl.
G06Q 10/10    (2012.01)
H04L 12/58    (2006.01)

(52) U.S. Cl.
CPC ........... *H04L 51/22* (2013.01); *G06Q 10/107* (2013.01); *H04L 51/12* (2013.01); *H04L 51/14* (2013.01); *H04L 51/16* (2013.01)

(58) Field of Classification Search
None
See application file for complete search history.

(56) References Cited

U.S. PATENT DOCUMENTS

| | | | | |
|---|---|---|---|---|
| 6,847,989 B1* | 1/2005 | Chastain | ............... | G06Q 10/107 707/999.102 |
| 9,916,598 B2* | 3/2018 | Khoo | ................... | G06Q 10/107 |
| 9,961,030 B2* | 5/2018 | Murphy | .................. | H04L 51/08 |
| 2004/0088359 A1* | 5/2004 | Simpson | .............. | G06Q 10/107 709/206 |
| 2005/0144246 A1* | 6/2005 | Malik | .................. | G06Q 10/107 709/206 |
| 2006/0031307 A1* | 2/2006 | Bhatia | ..................... | H04L 51/12 709/206 |
| 2007/0156783 A1* | 7/2007 | Zbogar-Smith | ............................. | G06F 17/30011 |
| 2008/0313296 A1* | 12/2008 | Muller | ................. | G06Q 10/107 709/206 |
| 2010/0287249 A1* | 11/2010 | Yigang | ................ | G06Q 10/107 709/206 |
| 2011/0022674 A1* | 1/2011 | Callanan | ............. | G06Q 10/107 709/206 |
| 2011/0055196 A1* | 3/2011 | Sundelin | ........... | G06F 17/30528 707/711 |
| 2011/0307804 A1* | 12/2011 | Spierer | ................ | G06Q 10/107 715/752 |
| 2013/0055105 A1* | 2/2013 | Spierer | ................ | G06Q 10/107 715/752 |
| 2013/0086486 A1* | 4/2013 | Ahiakpor | ................ | H04L 51/22 715/752 |

(Continued)

*Primary Examiner* — Joshua Joo
(74) *Attorney, Agent, or Firm* — Maschoff Brennan

(57) ABSTRACT

Systems and techniques to automatically delete emails from an inbox associated with an employee in an enterprise are described. A message lifecycle engine that interfaces with a corporate email system may select an inbox of an email client application. The message lifecycle engine may delete an email in the inbox based at least in part on: (i) one or more sender rules associated with the email; (ii) one or more system rules associated with an email system used by the enterprise; (iii) one or more user rules created based on an analysis of user behavior; and (iv) one or more data loss prevention (DLP) policies.

14 Claims, 7 Drawing Sheets

(56) References Cited

U.S. PATENT DOCUMENTS

| | | | | |
|---|---|---|---|---|
| 2013/0191759 A1* | 7/2013 | Bhogal | ................... | G06Q 10/10 |
| | | | | 715/752 |
| 2015/0188870 A1* | 7/2015 | Sharp | ...................... | H04L 51/22 |
| | | | | 715/752 |
| 2015/0264004 A1* | 9/2015 | Khoo | ................... | G06Q 10/107 |
| | | | | 709/206 |
| 2015/0372964 A1* | 12/2015 | Volach | .................... | H04L 51/34 |
| | | | | 709/206 |
| 2016/0065517 A1* | 3/2016 | Beausoleil | .............. | H04L 51/14 |
| | | | | 709/206 |
| 2016/0148014 A1* | 5/2016 | Peterson | ............. | G06F 21/6245 |
| | | | | 726/28 |
| 2017/0302603 A1* | 10/2017 | Cue | ......................... | H04L 51/12 |

* cited by examiner

ELECTRONIC MAIL (EMAIL) MESSAGE LIFECYCLE MANAGEMENT

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a corporate messaging system, particularly in an enterprise email system (e.g., Outlook®, Lotus Notes®, or the like), inboxes may become filled with unwanted messages and attachments, causing user accounts to go over a preset storage quota and becoming suspended. Many of the unwanted messages may be generated within the enterprise itself. For example, the corporate information technology (IT) department may send messages to all employees about network outages and repairs, the corporate communications department may send a daily newsletter, etc. Inboxes with unwanted messages and attachments also increase storage costs for information technology (IT) departments. While many solutions, have been proposed, most solutions, such as Outlook® add-ins, are client-side apps aimed at end-users. Generally these solutions attempt to re-organize mailboxes to make users more productive at dealing with the clutter. However, putting the onus on recipients to keep up with a barrage of incoming messages is not a reliable option.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques to automatically delete emails from an inbox associated with an employee in an enterprise are described. A message lifecycle engine that interfaces with a corporate email system may select an inbox of an email client application. The message lifecycle engine may delete an email in the inbox based at least in part on: (i) one or more sender rules associated with the email; (ii) one or more system rules associated with an email system used by the enterprise; (iii) one or more user rules created based on an analysis of user behavior; and (iv) one or more data loss prevention (DLP) policies.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
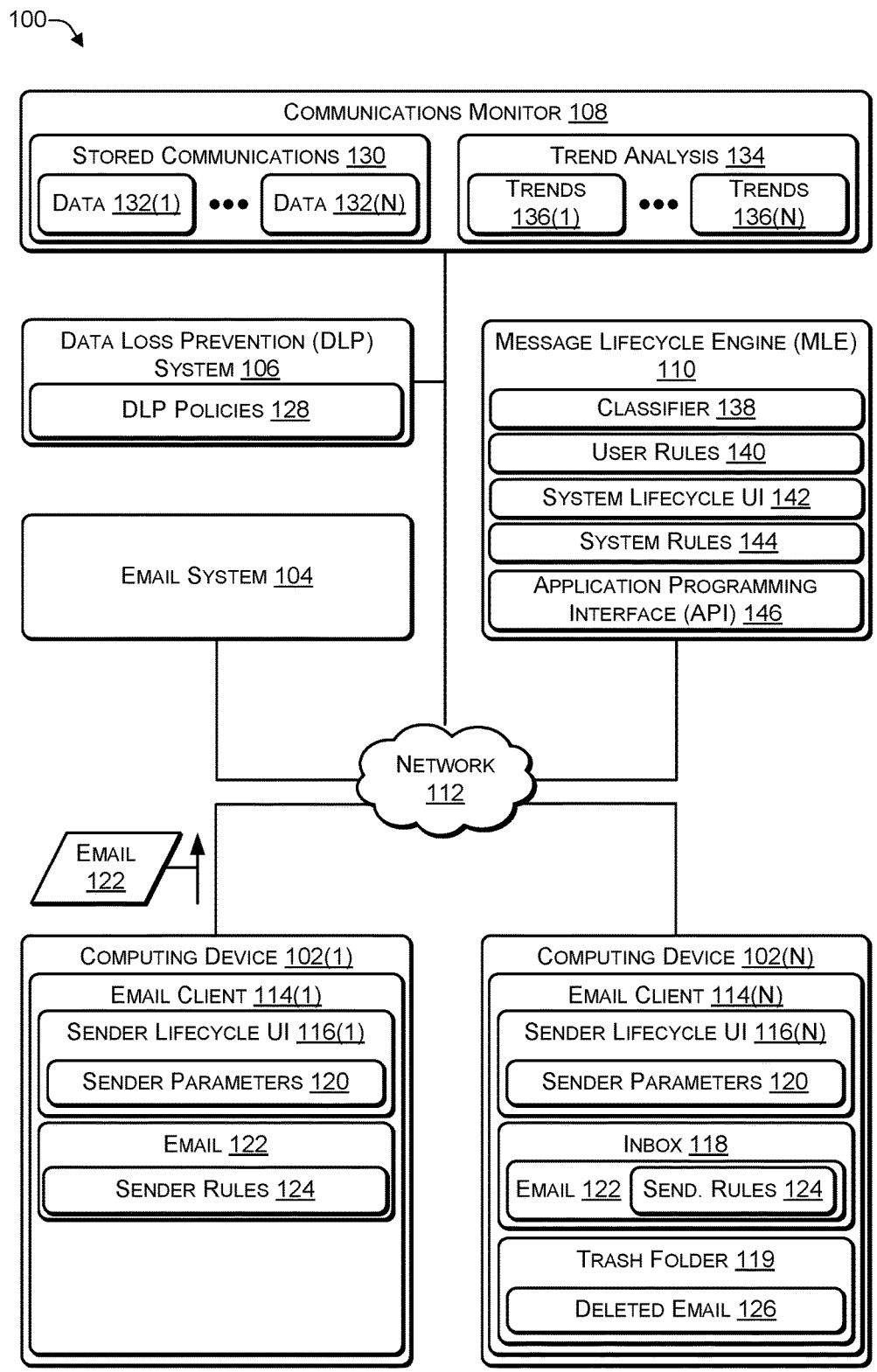
FIG. 1 is a block diagram illustrating an enterprise system that includes a message lifecycle engine according to some examples.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein illustrate a Message Lifecycle Engine (MLE) to reduce inbox clutter in a corporate environment. The MLE may automatically delete messages that are no longer relevant, such as outdated messages. For example, when corporate communications sends a daily newsletter email message to all employees, the sender may configure the email message to be automatically deleted (or archived) after a predetermined time period (or at a specified date). As another example, time sensitive emails may be sent with a "Do Not Forward" tag for a predetermined time period (e.g., 7 days) after which the tag may be automatically removed by the MLE. A sender may instruct the MLE to update a security tag associated with an email message, e.g., the email may be tagged "confidential" for 30 days, after which the MLE may change the tag to "public." In addition to unclogging inboxes, deleting email messages may increase information security by removing time-sensitive emails from the email system, thereby preventing potential data loss.

In some cases, a communications monitoring system (e.g., Dell® Unified Communication Command Suite (UCCS)) that monitors and stores corporate communications, such as email messages, may provide the stored messages to the MLE for analysis (e.g., using machine learning). For example, each employee's behavior, with reference to the employee's inbox, may be analyzed to identify user preferences, such as which types of email messages are read, which types of email messages go unread, which types of email messages the employee deletes without reading, etc. This analysis may be used to create rules for each employee's inbox to automatically delete email messages. For example, the analysis of a first employee may determine that he does not read email messages sent by a particular sender regarding a particular topic (e.g., ignores emails from the IT department regarding network outages). The analysis of a second employee may determine that she reads a particular type of email (e.g., the daily corporate newsletter email) and deletes the email after reading it.

Thus, the MLE may control the length of time that email messages remain in employee inboxes. The MLE may provide an application programming interface (API) to communicate with a corporate email system, such as Microsoft® Exchange®. The MLE may communicate with a communications monitoring system, such as Dell® UCCS, to gather usage data from individual employee inboxes to determine what actions to perform to which types of messages. An add-in to an email client, such as Microsoft® Outlook®, may enable a sender of an email message to set lifecycle parameters, such as an expiry date, for each email message. Because the MLE interfaces with the server-side email system, the MLE may manage and enforce the availability of messages based on a variety of factors, including user specified expiry dates, corporate data loss prevention (DLP) policies, user behavior, corporate communication policies, and the like.

The MLE may control the availability of messages based on four parameters: (1) sender defined lifecycle parameters, (2) system administrator defined lifecycle parameters, (3) user behavior analysis (e.g., using machine learning on archived messages), and (4) corporate DLP policies. The sender defined lifecycle parameters may enable a sender to specify lifecycle parameters, such as setting an expiry date for a message. On the expiry date, the MLE may automatically remove copies of the message from individual email inboxes. Additional sender defined lifecycle parameters may determine whether the MLE removes only unread messages, or all messages (e.g., regardless of whether they are read or unread).

The system administrator defined lifecycle parameters may enable a system administrator to specify lifecycle parameters for particular types of emails, such as internally generated (e.g., corporate) emails, e.g., emails generated by (i) an IT system, (ii) a human resources information system (HRIS), (iii) a customer relationship management (CRM) systems, (iv) a collaboration system (e.g., Slack®), and other enterprise-related systems. The messages generated by enterprise-related system may relate to time sensitive topics, such as status updates associated with system/network availability, change notifications, etc. A user interface (UI) of the MLE may enable the system administrator to specify an expiry date for such time-sensitive email messages. For example, an IT department may send a first email message indicating a network outage, e.g., indicating that a portion of the corporate network is unavailable due to an equipment malfunction. After a period of time has elapsed, the IT department may send a second email message indicating that the portion of the corporate network has been fixed and is functioning normally. If such network outages typically last less than 24 hours, the system administrator may specify lifecycle parameters defining a rule that an email message sent by the IT department with a subject line related to a network outage expires 24 hours after it is sent. Optionally, the system administrator may specify lifecycle parameters defining a rule that when the second email message is received in an inbox, if the first email message is unread, then the first email message and the second email message are automatically deleted. In other words, because the employee did not read the email regarding the outage, as far as the employee is concerned, the email indicating that the outage has been addressed is moot, so both emails may be deleted.

By using machine learning to analyze data stored by a communications monitor (e.g., Dell® UCCS), the MLE may determine the characteristics of messages that may be flagged for deletion. Characteristics may include types of messages that a particular employee does not read, types of messages that the employee reads and then deletes, and/or types of messages that are classified as private (e.g., messages with a particular classification may be deleted from the inbox after a specified time interval regardless of whether the email was read or not).

Using the data classification system of a corporate DLP system, the MLE can schedule deletion of email messages that have particular characteristics to comply with data loss prevention policies. For example, email messages tagged as "Do Not Forward" may be scheduled for deletion regardless of whether an associated DLP policy was triggered or not. In this example, email messages may be moved into a "recycle" folder (or "trash" folder) and then permanently deleted after 30 days. The user has 30 days to retrieve messages from the "recycle" folder (or "trash" folder) that the user desires to keep. The MLE may use machine learning to analyze the user's retrieval actions and create a rule to save (e.g., rather than delete) similar messages. By automatically deleting messages with a particular classification (e.g., restricted data, private data, etc.), the MLE may reduce the risk of data loss or leakage. In addition, automatically deleting time-sensitive messages that are no longer relevant helps users manage their email inboxes and reduces the overhead of mailbox storage. Of course, messages deleted by the MLE system (or deleted by users) may be archived to satisfy compliance regulations (e.g., to enable e-discovery). In addition, while the examples described herein relate to email message systems, the systems and techniques may be applied to other messaging systems as well.

FIG. 1 is a block diagram illustrating an enterprise system 100 that includes a message lifecycle engine according to some examples. The enterprise system 100 includes one or more computing devices 102 (e.g., a computing device 102(1) to 102(N), where N>0), an email system 104 (e.g., Microsoft® Outlook®), a data loss prevention (DLP) system 106, a communications monitor 108 (e.g., Dell® Unified Communications Command Suite (UCCS)), and a message lifecycle engine (MLE) 110 communicatively coupled to a network 112. The network 112 may include different types of technologies, including wired technologies (e.g., Ethernet, etc.) and wireless technologies (e.g., cellular, WiFi®, Bluetooth® etc.).

An email client may be installed on individual computing devices of the computing devices 102(1) to 102(N). For example, the computing device 102(1) may have an email client 114(1) and the computing device 102(N) may have an email client 114(N). Each of the email clients 114 may include an add-in lifecycle interface. For example, the email client 114(1) may have a sender lifecycle UI 116(1) as an add-in and the email client 114(N) may have a sender lifecycle UI 116(N) as an add-in. Each sender lifecycle UI 116 may enable a sender of an email message (e.g., the email 122) to set the sender parameters 120 (e.g., an expiry date etc.) for each email message, such as the email 122.

The email client 114 may include an inbox 118, and a trash folder 119. The sender lifecycle UI 116 may enable a sender of an email 122 to specify various sender parameters 120 that are associated with the email 122 as one or more sender rules 124. The sender rules 124 may specify when the email 122 is to be moved to the trash folder 119, when the email 122 is to be permanently deleted, and other lifecycle related rules. For example, the sender may use the sender parameters 120 to specify an expiry data for the email 122, thereby creating one of the sender rules 124 specifying that the email 122 is to be deleted on (or after) the expiry date. As another example, an IT department sending email messages regarding network outages may specify the sender rules 124 as, for example, "delete all messages that are unread after 24 hours."

The sender rules 124 may enable the sender to specify whether deletion is temporary or permanent. For example, when the sender rules 124 indicate that the email 122 is to be temporarily deleted, the email 122 may be moved into the trash folder 119 and become a deleted email 126. The trash folder 119 may enable a user to retrieve the deleted email 126 for viewing or archiving. The deleted email 126 may be permanently deleted by a user instruction (e.g., "empty the trash folder"), when one of the sender rules 124 is satisfied (e.g., permanently delete after 30 days), by the MLE 110, or any combination thereof. If the sender rules 124 indicate that the email 122 is to be permanently deleted, the email 122 may be deleted in such a way that the user is unable to retrieve and view the email 122 after the email 122 is deleted. For example, if the email 122 includes sensitive (e.g., restricted or classified) data, the sender rules 124 may indicate that the email 122 is to be permanently deleted to comply with one or more DLP policies 128.

The communications monitor 108 may store, as stored communications 130, various types of enterprise communications, including email messages, voice mail messages, instant messages, video conferencing, audio conferencing, other types of communications, or any combination thereof. The stored communications 130 may include data 132(1) associated with a first employee's communications to data 132(N) associated with an Nth employee's communications. In some cases, one or more of the data 132 may include metadata. For example, in some implementations, to conserve storage, metadata (e.g., the data 132) associated with communications (e.g., rather than the communications themselves) may be stored as the stored communications 130. In other implementations, the actual communications may be stored along with the associated metadata. The MLE 110 may perform a trend analysis 134 on the stored communications 130 to identify trends 136(1) to 136(N), with the trends 136(1) associated with the first employee's communications and the trends 136(N) associated with the Nth employee's communications. For example, the trends 136(N) may indicate that the Nth employee deletes the daily corporate newsletter email message after reading it and deletes all IT email messages pertaining to network outages without reading them.

The MLE 110 may analyze the trends 136 using a machine learning algorithm, such as a classifier 138, and create user rules 140. For example, the user rules 140 may include rules for the Nth employee's inbox that automatically (e.g., without human interaction) delete the daily corporate newsletter email message after the Nth employee reads it (e.g., after the status of the email changes from unread to read) and delete all IT email messages pertaining to network outages (e.g., regardless of whether the messages are read or unread). The MLE 110 may provide a system lifecycle UI 142 to enable a system administrator to specify system rules 144. The system rules 144 may include lifecycle rules that are applied system wide, e.g., to all employee inboxes. For example, one of the system rules 144 may specify that IT email messages pertaining to network outages are automatically deleted after 24 hours. As another example, one of the system rules 144 may specify that if a first IT email message pertaining to a network outage is unread and a second IT email message is received indicating that the network outage has been resolved, both email messages are automatically deleted after the second message is received.

The MLE 110 may include an API 146 to interface with other corporate systems, including the email system 104, the DLP system 106, and the communications monitor 108.

The MLE 110 may reduce clutter associated with each employee's inbox (e.g., the inbox 118) by automatically deleting emails based on the sender rules 124, the user rules 140, and the system rules 144. The MLE 110 may automatically delete email messages (e.g., the email 122) in each employee's inbox that are no longer relevant, such as outdated messages. For example, when corporate communications sends a daily newsletter email message to all employees, the sender may specify the sender parameters 120 to create the sender rules 124 specifying that the email 122 is to be deleted after a predetermined time period (or at a specified date). As another example, a time sensitive email may be sent with a rule that the email has a "Do Not Forward" tag for a predetermined time period (e.g., 7 days) after which the MLE 110 automatically removes the "Do Not Forward" tag to enable the email to be forwarded. A sender may use the sender parameters 120 to instruct the MLE 110 to update a security tag associated with the email 122, e.g., the email may be tagged "confidential" for 30 days, after which the MLE may change the tag to "public."

In addition, the MLE 110 may interface with the DLP system 106. The MLE 110 may create at least some of the system rules 144 to enable compliance with the DLP policies 128. For example, when documents classified as "restricted" or "private" are attached to an email, the system rules 144 may specify that the email cannot be sent to a recipient outside the enterprise, that the email (and attachments) will be automatically deleted after a predetermined period of time, or the like.

The communications monitor 108 may monitor and store corporate communications, such as email messages, and may provide the stored messages to the MLE 110 for trend analysis (e.g., using machine learning). For example, each employee's behavior, with reference to the employee's inbox, may be analyzed to determine the trends 136, such as which types of email messages each employee reads, which types of email messages each employee does not read, which types of email messages the employee deletes without reading, etc. The trends 136 may be used to create the user rules 140 for each employee's inbox to automatically delete email messages. For example, the analysis of trends 136(N) may determine that the employee does not read email messages sent by a particular sender regarding a particular topic (e.g., ignores emails from the IT department regarding network outages). The analysis of trends 136(1) may determine that the employee reads a particular type of email (e.g., the daily corporate newsletter email) and deletes the email after reading it. Thus, the MLE 110 may control the length of time that email messages, such as the email 122, remains in the inbox 118.

The MLE 110 may control the availability of messages based on: (1) the sender parameters 120, (2) system administrator defined system rules 144, (3) the user rules 140, and (4) the corporate DLP policies 128. The sender parameters 120 may enable a sender to specify the sender parameters 120, such as setting an expiry date for a message (e.g., the email 122). On the expiry date, the MLE 110 may automatically remove copies of the message from individual email inboxes (e.g., remove the email 122 from inbox 118). The sender parameters 120 may create the sender rules 124 that determine when the MLE 110 removes messages.

The system rules may enable a system administrator to specify lifecycle parameters for particular types of emails, such as internally generated (e.g., corporate) emails, e.g., emails generated by (i) an IT system, (ii) a human resources information system (HRIS), (iii) a customer relationship management (CRM) systems, (iv) a collaboration system (e.g., Slack®), and other enterprise-related systems. The messages generated by enterprise-related system may relate to time sensitive topics, such as status updates associated with system/network availability, change notifications etc. The system lifecycle UI 142 may enable the system administrator to specify rules on corporate messages are deleted such as by specifying an expiry date for time-sensitive email messages. For example, an IT department may send a first email message indicating a network outage, e.g., indicating that a portion of the corporate network is unavailable due to an equipment malfunction. After a period of time has elapsed, the IT department may send a second email message indicating that the portion of the corporate network has been fixed and is functioning normally. If such network outages typically last less than 24 hours, the system administrator may use the system lifecycle UI 142 to define a rule (e.g., one of the system rules 144) that an email message sent by the IT department with a subject line related to a network outage expires 24 hours after the email message is sent. Optionally, the system administrator may use the system lifecycle UI 142 to define a rule that when the second email message is received in an inbox, if the first email message is unread, then the first email message and the second email message are automatically deleted.

The classifier 138 may be used to analyze the data 132 to identify the trends 136. The trends 136 may be used to create the user rules 140 to automatically perform actions (e.g., delete, move to trash folder etc.) that the user would normally perform. For example, if an employee normally reads a particular type of email message and then deletes the email message, the user rules 140 may automatically delete the particular type of email message after the status of the email message changes from "unread" to "read." The user rules 140 may specify that certain types of messages are to be deleted from the inbox after a specified time interval, e.g., regardless of whether the email was read or not.

Using a data classification system of the DLP system 106, the MLE 110 may schedule deletion of email messages that have particular characteristics to comply with the DLP policies 128. For example, email messages tagged as "Do Not Forward" may be scheduled for deletion regardless of whether one of the DLP policies 128 was triggered. In this example, email messages may be moved into the trash folder 119 after a condition has been met (e.g., the email has been read or X days have passed from when the email was sent) and, after 30 days in the trash folder, permanently deleted. The user thus has 30 days to retrieve messages from the trash folder 119. The MLE 110 may use the classifier 138 to analyze the data 132 to create the user rules 140. By automatically deleting messages with a particular classification (e.g., restricted data, private data, etc.) after the message has been read, the MLE 110 may reduce the risk of data loss or leakage. In addition, automatically deleting time-sensitive messages that are no longer relevant may help users manage their email inboxes and reduce the costs of email storage.

Thus, the MLE 110 may automatically delete emails from inboxes based on the user rules 140, the system rules 144, the DLP policies 128, and the sender rules 124. The user rules 140 may be email deletion rules specific to each user and may be based on analyzing each user's behavior (e.g., regarding deleting emails). Thus, the user rules 140 may mimic each user's past behavior. For example, if the user typically reads and then deletes the daily corporate newsletter email, then the user rules 140 may cause the MLE 110 to automatically delete the daily corporate newsletter email after the user reads the email (e.g., after the email's status changes from "unread" to "read"). The system rules 144 may include email deletion rules that are applied globally, e.g., to all users. The system rules 144 may be used for emails that are typically sent to all (or a large number) of employees, such as human resources emails ("our corporate healthcare provider is changing from ABC to XYZ"), corporate newsletters, IT network outage emails, and the like. The DLP policies 128 may specify that documents with certain types of DLP classifications (e.g., restricted, private, or the like) are automatically associated with a particular rule, e.g., delete emails with restricted content or restricted attachments within 30 days of being sent (or received). The sender rules 124 may be email deletion rules specified by a sender of an email. For example, the sender may take into consideration the time-sensitive nature of the content (or attachments) of the email and provide an expiry date (e.g., delete on MM-DD-YYYY) or an expiry period (e.g., delete after 10 days), or the like. The user rules 140, the system rules 144, the DLP policies 128, and the sender rules 124 may specify whether a deletion is temporary (e.g., move to trash folder 5 business days after email is sent), permanent (e.g., "permanently delete 10 business after email is sent), or a combination of both (e.g., move to trash folder 5 business days after email is sent and then permanently delete 10 business after email is sent). In this way, the MLE 110 may automatically delete particular emails in inboxes, thereby reducing clutter and reducing storage costs.

Figure 2:
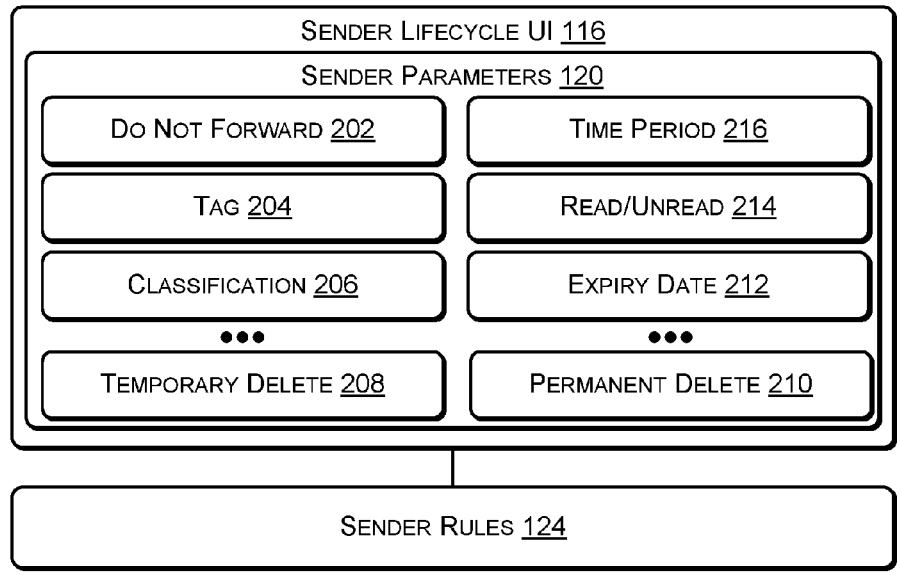
FIG. 2 is a block diagram illustrating a system that includes lifecycle user interfaces according to some examples.
Figure 2:
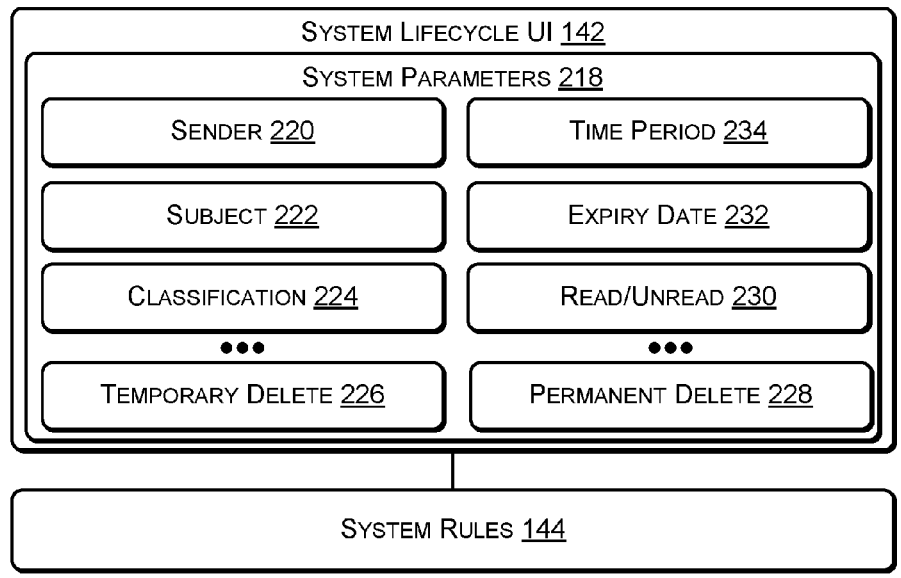

FIG. 2 is a block diagram illustrating a system 200 that includes lifecycle user interfaces according to some examples. FIG. 2 includes an example of the sender lifecycle UI 116 and the system lifecycle UI 142 of FIG. 1.

A sender may use the sender parameters 120 to create the sender rules 124. The sender parameters 120 may include a do not forward 202 parameter, a tag 204 parameter, a classification 206 parameter, a temporary delete 208 parameter, a permanent delete 210 parameter, an expiry date 212 parameter, a read/unread 214 parameter, a time period 216 parameter, etc. Of course, other parameters may be included in the sender parameters 120 in addition to those illustrated in FIG. 2. The do not forward 202 may be used in a rule to specify how to treat email messages marked "do not forward." The tag 204 may be used in a rule to specify how to treat email messages marked with a particular type of tag, such as a security tag (e.g., personal, private, public) or an importance tag (e.g., low importance, medium importance, high importance). The classification 206 may be used in a rule to specify how to treat email messages marked with a particular type of classification (e.g., restricted, confidential, internal, or public). The temporary delete 208 may be used in a rule to specify that an email is to be temporarily deleted (e.g., moved to the trash folder 119 of FIG. 1) if the parameters of the rule are satisfied. The permanent delete 210 may be used in a rule to specify that an email is to be permanently deleted (e.g., removed from the inbox or from the trash folder 119 of FIG. 1) if the parameters of the rule are satisfied. The expiry date 212 may specify in a rule that an email is to be deleted on (or after) a particular date. The read/unread 214 may specify in a rule what action(s) to perform if the status of an email is "read" and what action(s) to perform if the status of the email is "unread." For example, a rule may specify that certain types of emails are to be permanently deleted if read and temporarily deleted if unread (e.g., to enable the user to retrieve and view the email). The time period 216 may specify in a rule that an email is to be deleted after a particular period of time has elapsed. For example, daily newsletter emails may be sent with a parameter indicating that the emails are to be automatically deleted after 24 hours.

The system lifecycle UI 142 may provide system parameters 218 to enable a user to create the system rules 144. The system rules 144 may be applied system wide to all emails in the enterprise. For example, the system rules 144 may be used to specify when corporate emails are to be deleted. The system parameters 218 may include a sender 220, a subject 222, a classification 224, a temporary delete 226, a permanent delete 228, a read/unread 230, an expiry date 232, and a time period 234. Of course, other parameters may be included in the system parameters 218 in addition to those illustrated in FIG. 2. The sender 220 may be used to specify in a rule that emails sent by a particular sender are to be deleted. The subject 222 may be used to specify in a rule that emails having a particular word or phrase in the subject line are to be deleted when particular conditions are satisfied. For example, a system rule may specify that emails with "daily newsletter" in the subject line that are sent by a corporate communications department are to be automatically deleted 24 hours after the email has been sent (or 24 hours after the email has been received by an inbox). A system rule may specify in a rule that emails with "network outage" in the subject line that are sent by an IT department are to be automatically deleted 24 hours after the email has been sent (or 24 hours after the email has been received by an inbox). The classification 224 may be used to specify in a rule how to treat email messages marked with a particular type of classification (e.g., restricted, confidential, internal, or public). The temporary delete 226 may be used to specify in a rule that an email is to be temporarily deleted (e.g., moved to the trash folder 119 of FIG. 1) if the parameters of the rule are satisfied. The permanent delete 228 may be used to specify in a rule that an email is to be permanently deleted (e.g., removed from the inbox or from the trash folder 119 of FIG. 1) if the parameters of the rule are satisfied. The expiry date 232 may specify that an email is to be deleted on (or after) a particular date. The read/unread 230 may specify in a rule what action(s) to perform if the status of an email is "read" and what action(s) to perform if the status of the email is "unread." For example, a rule may specify that certain types of emails are to be permanently deleted if read and temporarily deleted if unread (e.g., to enable the user to retrieve and view the email). The time period 234 may be used to specify in a rule that an email is to be deleted after a particular period of time has elapsed. For example, daily newsletter emails may be sent with a parameter indicating that the emails are to be automatically deleted after 24 hours.

In the flow diagrams of FIGS. 3, 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to FIGS. 1 and 2, as described above, although other models, frameworks, systems and environments may implement these processes.

Figure 3:
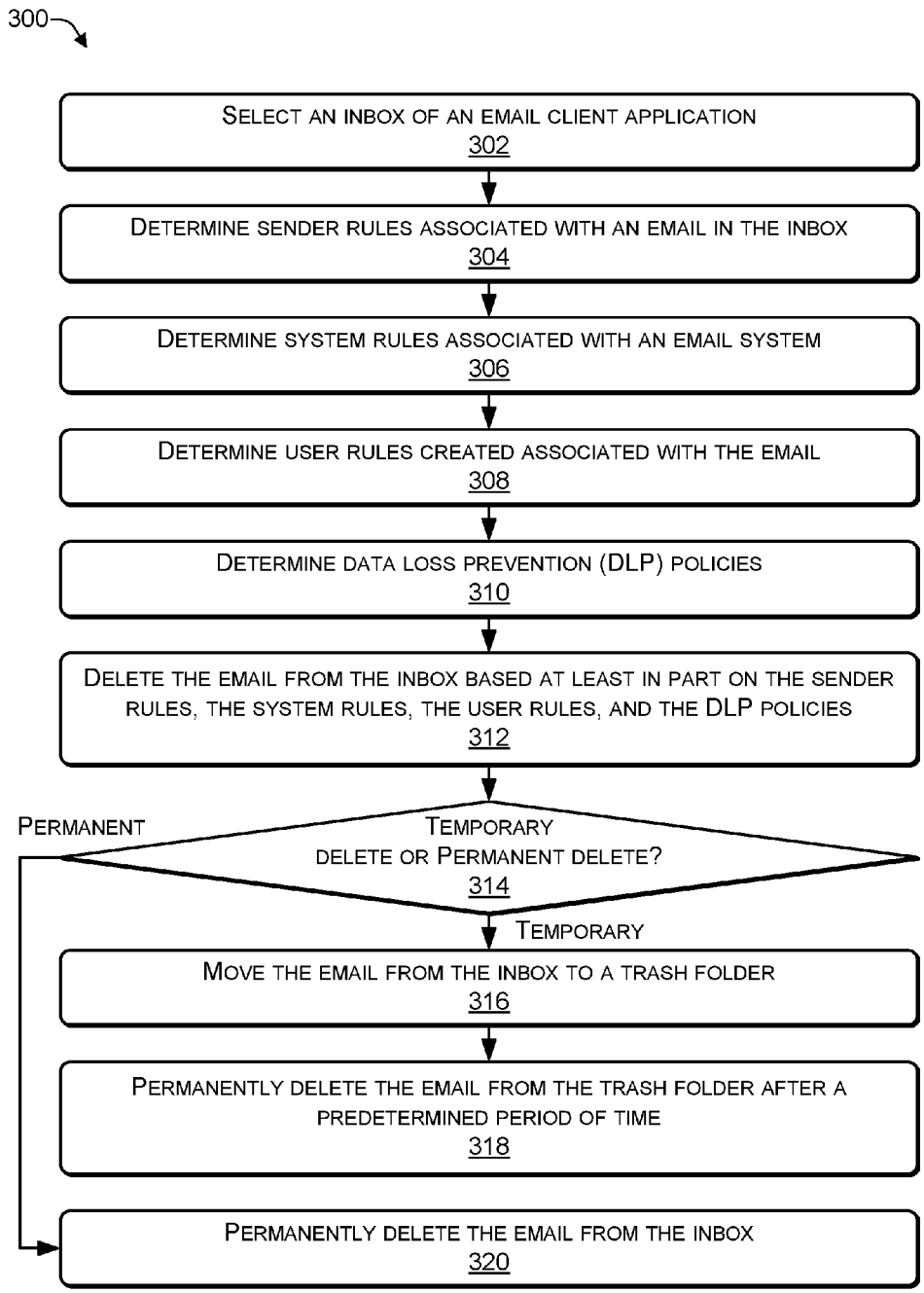
FIG. 3 is a flowchart of a process that includes determining sender rules associated with an email according to some examples.

FIG. 3 is a flowchart of a process 300 that includes determining sender rules associated with an email according to some examples. The process 300 may be performed by the MLE 110 or the email client 114 of FIG. 1.

At 302, an inbox of an email client application may be selected. At 304, sender rules associated with an email in the inbox may be determined. At 306, system rules associated with an email system may be determined. At 308, user rules associated with the email may be determined. At 310, DLP policies may be determined. At 312, the email may be deleted from the inbox based at least in part on the sender rules, the system rules, the user rules, and the DLP policies. For example, in FIG. 1, the MLE 110 may select an inbox of each email client installed on each of the computing devices 102(1) to 102(N), such as the inbox 118 of the email client 114 installed on the computing device 102(N). The MLE 110 may determine the sender rules 124 associated with the email 122, the user rules 140, the system rules 144, and the DLP policies 128. The MLE 110 may determine to delete the email 122 from the inbox 118 based at least in part on the sender rules 124, the user rules 140, the system rules 144, and the DLP policies 128. For example, the email 122 may be deleted because the email 122 satisfies one or more of the sender rules 124, the user rules 140, the system rules 144, or the DLP policies 128.

At 314, a determination may be made as to whether to permanently delete the email or temporarily delete the email. In response to determining, at 314, to temporarily delete the email, the email may be moved from the inbox to a trash folder, at 316. At 318, the email may be permanently deleted from the trash folder after a predetermined period of time. In response to determining, at 314, to permanently delete the email, the email may be permanently deleted from the inbox, at 320. For example, in FIG. 1, the MLE 110 may determine to delete the email 122 permanently or temporarily based at least in part on the sender rules 124, the user rules 140, the system rules 144, and the DLP policies 128. If the MLE 110 determines that the email 122 is to be permanently deleted, the MLE 110 may delete the email 122 such that the email 122 is not retrievable or viewable after being deleted. If the MLE 110 determines that the email 122 is to be temporarily deleted, the MLE 110 may move the email 122 from the inbox 118 to the trash folder 119 to create the deleted email 126, where the deleted email 126 may be retrieved from the trash folder 119 for viewing. After the deleted email 126 has been in the trash folder 119 for at least a predetermined period of time, the MLE 110 may permanently delete the deleted email 126 from the trash folder 119. After deletion from the trash folder 119, the deleted email 126 may not be retrieved from the trash folder 119 for subsequent viewing.

Thus, the MLE 110 may interface with the email system 104 on the server side (rather than the client side) and automatically delete emails from the inboxes of email clients installed on the computing devices 102(1) to 102(N). This may save each employee time and effort as each employee does not have to manually delete unwanted emails, unread emails, etc. while satisfying corporate DLP policies.

Figure 4:
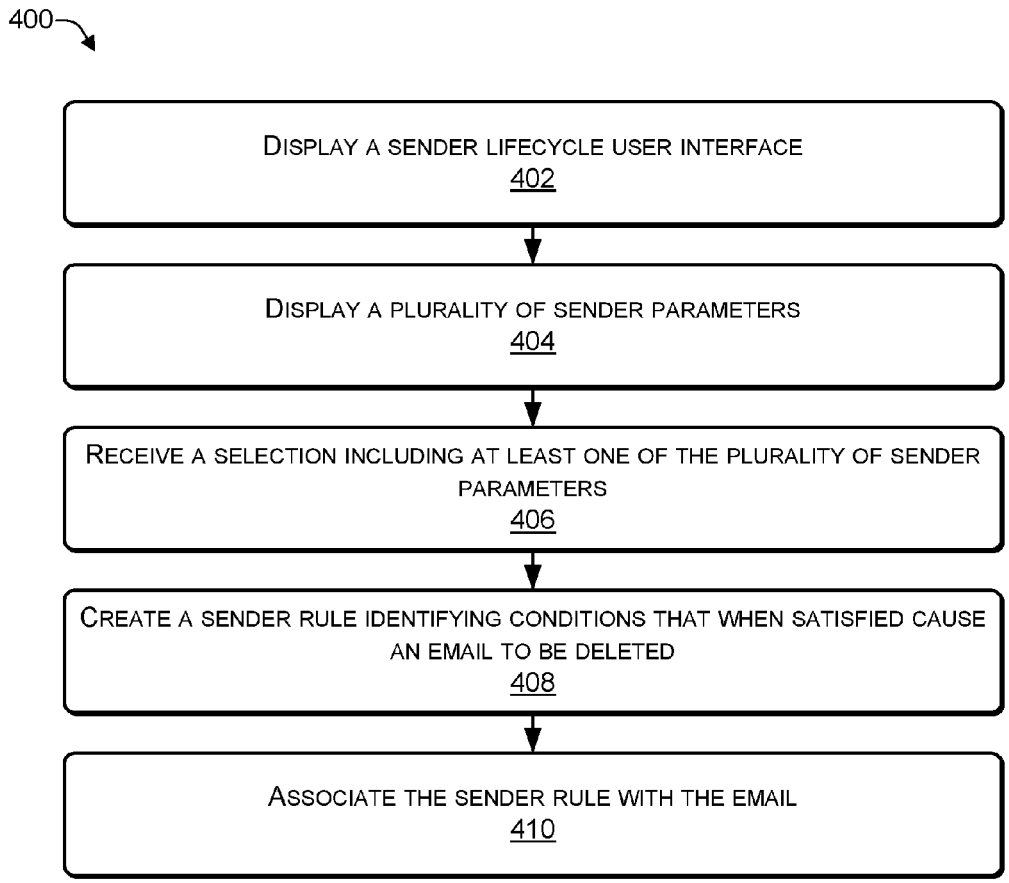
FIG. 4 is a flowchart of a process that includes creating a sender rule according to some examples.

FIG. 4 is a flowchart of a process 400 that includes creating a sender rule according to some examples. The process 400 may be performed by the email client 114 (e.g., the sender lifecycle UI 116) of FIG. 1 to enable a sender to specify when an email is to be deleted by the MLE 110.

At 402, a sender lifecycle UI may be displayed to a sender of an email. At 404, a plurality of sender parameters may be displayed (e.g., to a user). At 406, a selection may be received (e.g., from the user) that includes at least one of the plurality of sender parameters. At 408, a sender rule may be created to identify conditions that when satisfied cause an email to be deleted. At 410, the sender rule may be associated with the email.

For example, in FIG. 1, a user may create the email 122 and then use the sender lifecycle UI 116(1) to specify the sender parameters 120. Based on the sender parameters 120, the sender lifecycle UI 116(1) may automatically create the sender rules 124 and associate the sender rules 124 with the email 122. A sender may associate multiple sender rules with an email, e.g., 402 to 410 may be repeated to create multiple rules.

Thus, a sender sending time sensitive information can specify when the email is to be automatically deleted (e.g., by the MLE 110 or by the email client 114(N)). In this way, individual users receiving the email do not have to make any effort to delete the email. In addition, DLP policies may be satisfied by having emails with sensitive information automatically deleted under certain conditions. For example, specified emails may be automatically deleted regardless of whether the emails are read or unread.

Figure 5:
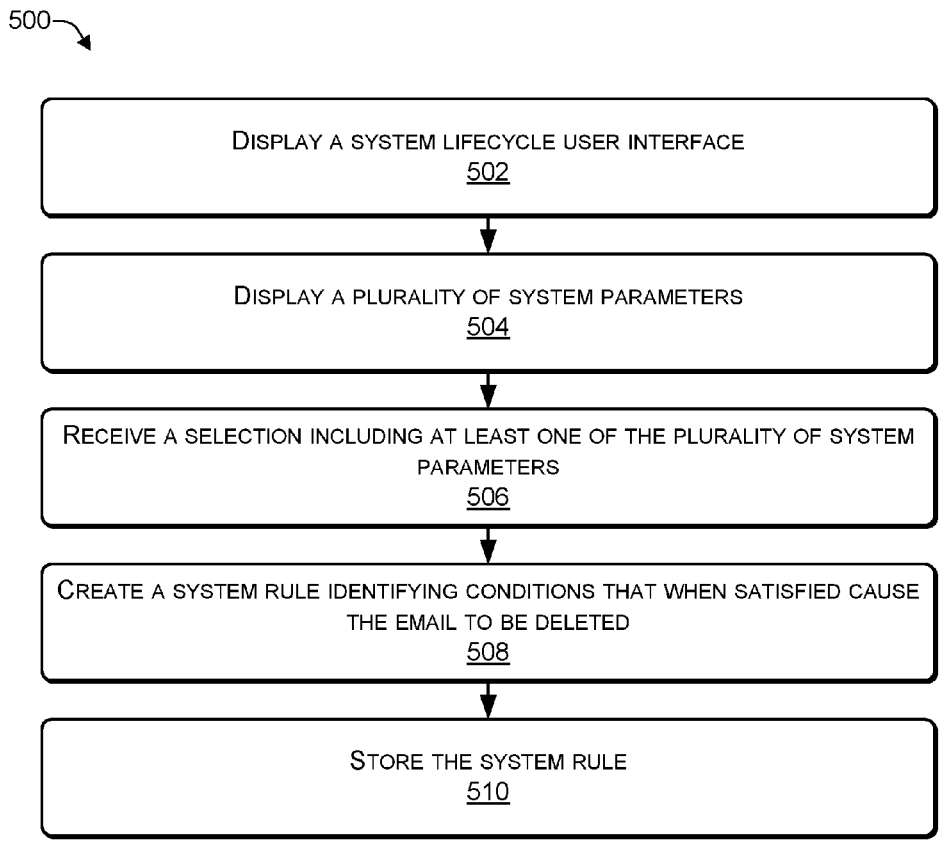
FIG. 5 is a flowchart of a process that includes creating a system rule according to some examples.

FIG. 5 is a flowchart of a process 500 that includes creating a system rule according to some examples. The process 500 may be performed by the MLE 110 (e.g., the system lifecycle UI 142) of FIG. 1.

At 502, a system lifecycle UI may be displayed (e.g., to a system administrator of an enterprise email system). At 504, a plurality of system parameters may be displayed. At 506, a selection may be received (e.g., from the system administrator) that includes at least one of the plurality of system parameters. At 508, a system rule may be created to identify conditions that when satisfied cause an email to be deleted. At 510, the system rule may be stored. For example, in FIG. 2, a system administrator may use the system lifecycle UI 142 to specify one or more of the system parameters 218 to create the system rules 144 which specify conditions under which corporate emails are to be deleted. The system rules 144 may be applied to delete emails across the enterprise, e.g., emails in the inboxes of the email clients 114(1) to 114(N). For example, based on one of the system rules 144, the MLE 110 may automatically delete a daily email message that includes a corporate newsletter 24 hours after the email message is sent (or received by an email client). Based on one of the system rules 144, the MLE 110 may automatically delete an email from the IT department regarding a network outage within a predetermined time (e.g., 4 hours) after the email message is sent (or received by an email client).

Thus, a system administrator can create rules specifying when particular types of emails (e.g., corporate emails) are to be automatically deleted (e.g., by the MLE 110 or by the email client 114(N)). In this way, individual users receiving the email do not have to make any effort to delete the email. In addition, DLP policies may be satisfied by having emails with sensitive information automatically deleted. For example, particular types of emails (e.g., emails that include or have attached restricted or private data) may be automatically deleted after a predetermined period of time, regardless of whether the emails are read or unread.

Figure 6:
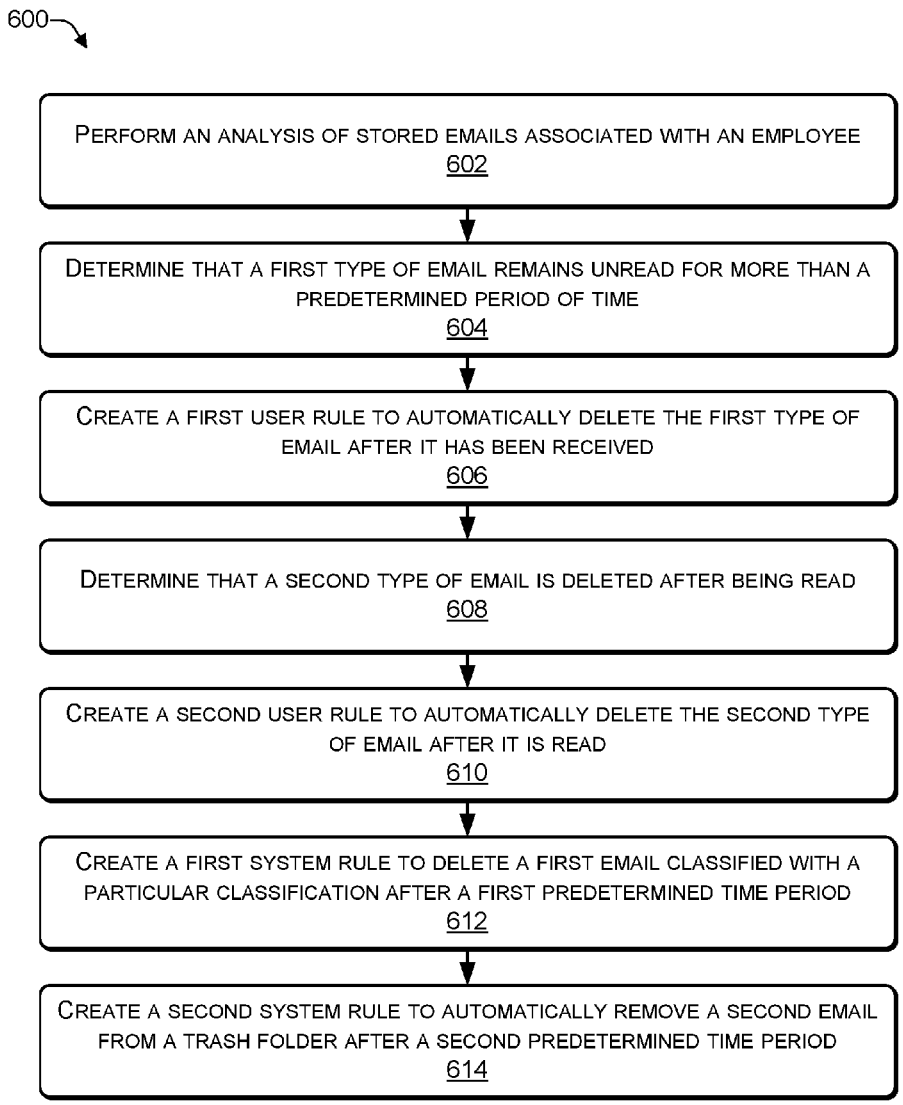
FIG. 6 is a flowchart of a process that includes creating a user rule according to some examples.

FIG. 6 is a flowchart of a process 600 that includes creating a user rule according to some examples. The process 600 may be performed by the MLE 110 (e.g., the classifier 138) of FIG. 1.

At 602, an analysis of stored emails associated with an employee may be performed. For example, in FIG. 1, the classifier 138 may perform the trend analysis 134 of the stored communications 130 to determine the trends 136. Based on the trends 136, the MLE 110 may create the user rules 140. A particular portion of the user rules 140 may be associated with each email client 114. For example, a first set of user rules may be associated with the email client 114(1) and an Nth set of user rules may be associated with the email client 114(N).

At 604, a determination may be made, based on the analysis, that a first type of email remains unread for more than a predetermined period of time, for a particular employee. At 606, a first user rule may be created (for the particular employee's inbox), based on the analysis, to automatically delete the first type of email after it has been received. For example, in FIG. 1, the classifier 138 may determine that an employee using the email client 114(1) does not read a first type of email (e.g., emails from the IT department related to network outages) and create one of the user rules 140 for the email client 114(1) to delete the first type of email after it has been received by the email client 114(1).

At 608, a determination may be made, based on the analysis, that a second type of email is deleted after being read, for a particular employee. At 610, a second user rule may be created (for the particular employee's inbox), based on the analysis, to automatically delete the second type of email after it has been read. For example, in FIG. 1, the classifier 138 may determine that an employee using the email client 114(N) deletes a second type of email (e.g., daily corporate newsletter emails from the corporate communications department) and create one of the user rules 140 for the email client 114(N) to delete the second type of email after it has been read (e.g., after the status of the email changes from unread to read).

At 612, a first system rule may be created (e.g., based on a DLP policy) to automatically delete a first email classified with a particular classification after a first predetermined time period. For example, in FIG. 1, the MLE 110 may create one of the system rules 144 based on the DLP policies 128 to delete emails that include (or have attached) data classified as restricted or private after a particular period of time (e.g., 5 business days). In some cases, the deletion may be permanent while in other cases the deletion may include moving an email from an inbox to a trash folder.

At 614, a second system rule may be created (e.g., based on a DLP policy) to automatically remove a second email from a trash folder after a second predetermined time period. For example, in FIG. 1, the MLE 110 may create one of the system rules 144 based on the DLP policies 128 to delete emails in the trash folder that include (or have attached) data classified as restricted or private that have been in the trash folder more than a predetermined period of time (e.g., 30 days).

Thus, a classifier may be used to analyze archived messages to determine user behavior. The analysis may be used to create user rules that mimic each user's behavior with respect to certain types of messages. For example, if a user typically does not read a particular type of message, then a user rule may be created to automatically delete the particular type of messages after they are received by the user's email client. As another example, if a user typically reads a particular type of message and then deletes the message, then a user rule may be created to automatically delete the particular type of messages after the message has been read to mimic the user's behavior. The MLE 110 may also create at least some of the system rules 144 based on the DLP policies 128. By deleting emails that include (or have attached) data with a certain type of classification, the risk of data loss may be reduced, thereby improving the security of the enterprise.

Figure 7:
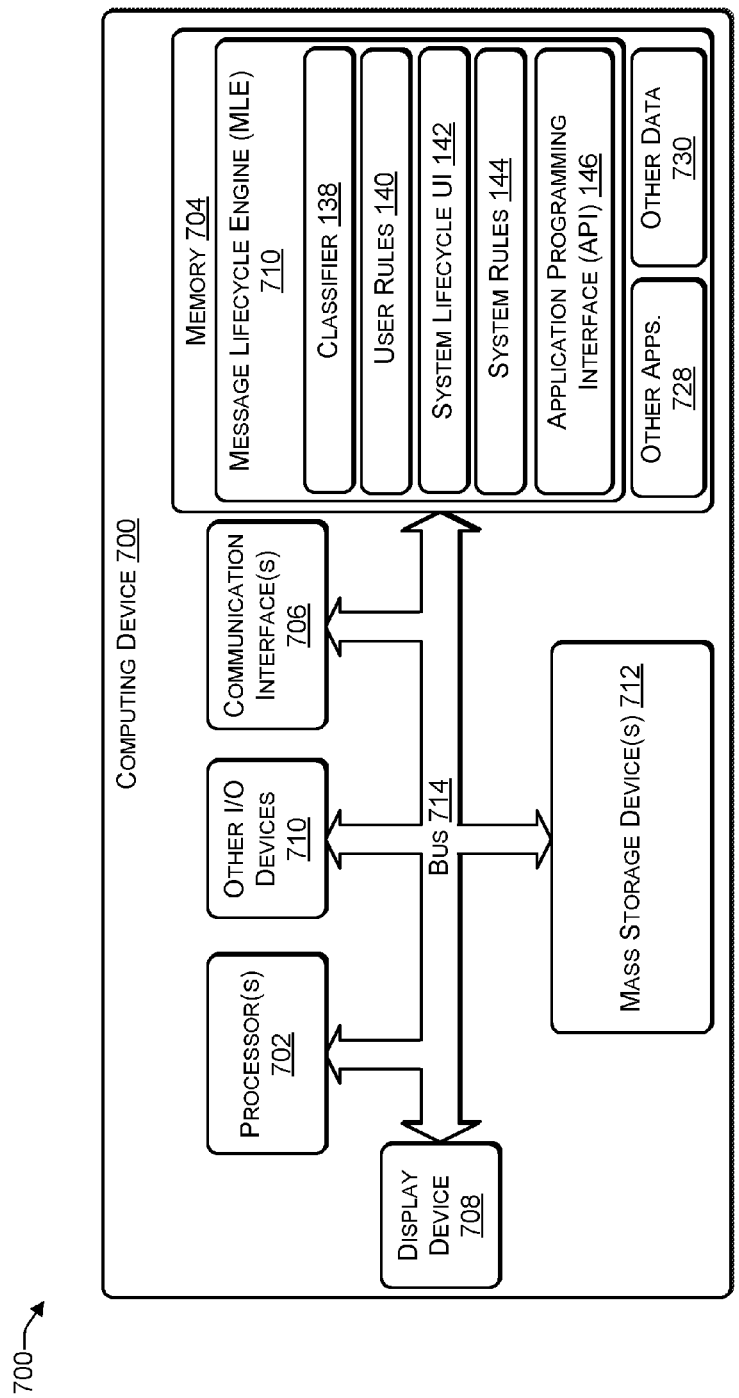
FIG. 7 illustrates an example configuration of a computing device that can be used to implement the systems and techniques described herein.

FIG. 7 illustrates an example configuration of a computing device 700 that can be used to implement the systems and techniques described herein, such as a corporate server to host the MLE 110. The corporate server may be located at the customer's premises or may be located at a remote site (e.g., cloud-based server). The computing device 700 may include one or more processors 702, a memory 704, communication interfaces 706, a display device 708, other input/output (I/O) devices 710, and one or more mass storage devices 712, configured to communicate with each other, such as via a system bus 714 or other suitable connection.

The processor 702 is a hardware device (e.g., an integrated circuit) that may include one or more processing units, at least some of which may include single or multiple computing units or multiple cores. The processor 702 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media (e.g., memory storage devices) for storing instructions which are executed by the processor 702 to perform the various functions described above. For example, memory 704 may generally include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data (e.g., via the network 112 of FIG. 1). The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

The computer storage media, such as memory 704 and mass storage devices 712, may be used to store software and data. For example, the computer storage media may be used to store software applications, such as the MLE 110, other applications 728, and other data 730. The other applications 728 may include other software functions, applications, and modules described herein. The other data 730 may include messages, intermediate data, and other types of data as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   selecting, by a message lifecycle engine, an inbox of an email client application associated with an employee in an enterprise;
   displaying, by an email client, a sender lifecycle user interface to a sender of the email;
   displaying, by the email client, a plurality of sender parameters, wherein the plurality of sender parameters comprise: a do not forward parameter, a security tag parameter, a classification parameter, a temporary delete parameter, a permanent delete parameter, an expiry date parameter, a read/unread parameter, and a time period parameter;
   receiving, by the email client, a selection including at least one of the plurality of sender parameters;
   creating, based on the selection, a particular sender rule of one or more sender rules, the particular sender rule identifying conditions that when satisfied cause the email to be deleted;
   associating, by the email client, the particular sender rule with the email; and
   deleting, by the message lifecycle engine, an email in the inbox based at least in part on:
      the one or more sender rules associated with the email;
      one or more system rules associated with an email system used by the enterprise;
      one or more user rules associated with the email, the one or more user rules created based on an analysis of user behavior; and
      one or more data loss prevention (DLP) policies.

2. The computer-implemented method of claim 1, further comprising:
   displaying, by the message lifecycle engine, a system lifecycle user interface to a system administrator of the email system;
   displaying, by the message lifecycle engine, a plurality of system parameters;
   receiving, by the message lifecycle engine, a selection including at least one of the plurality of system parameters; and
   creating, based on the selection, the one or more system rules identifying conditions that when satisfied cause a particular email to be deleted from the email system by the message lifecycle engine.

3. The computer-implemented method of claim 1, wherein deleting the email in the inbox comprises:
   moving the email from the inbox to a trash folder, the trash folder enabling the email to be retrieved and viewed.

4. The computer-implemented method of claim 3, further comprising:
   deleting, by the message lifecycle engine, the email in the trash folder based at least in part on:
      the one or more sender rules associated with the email;
      the one or more system rules associated with an email system used by the enterprise;
      the one or more user rules created based on an analysis of user behavior; and
      the one or more DLP policies.

5. One or more non-transitory computer-readable media storing instructions that are executable by one or more processors to perform operations comprising:
   selecting an inbox of an email client application associated with an employee in an enterprise;
   deleting an email in the inbox based at least in part on:
      one or more sender rules associated with the email;
      one or more system rules associated with an email system used by the enterprise;
      one or more user rules created based on an analysis of user behavior; and
      one or more data loss prevention (DLP) policies;
   performing an analysis of stored emails associated with the employee;
   determining, based at least in part on the analysis, that a particular type of email is deleted after being read; and
   creating a particular user rule of the one or more user rules to automatically delete the particular type of email after the particular type of email has been read.

6. The one or more non-transitory computer-readable media of claim 5, wherein deleting the email in the inbox comprises:
   determining that the one or more sender rules specify an expiry date;
   determining that a current date is greater than or equal to the expiry date; and
   moving the email from the inbox to a trash folder of the email client application.

7. The one or more non-transitory computer-readable media of claim 5, wherein deleting the email in the inbox comprises:
   determining that the one or more sender rules specify an expiry date and an unread parameter;
   determining that a current date is greater than or equal to the expiry date;
   determining that the email is unread; and
   moving the email from the inbox to a trash folder of the email client application.

8. The one or more non-transitory computer-readable media of claim 5, wherein deleting the email in the inbox comprises:
- determining that the one or more system rules specify a particular sender and a particular topic;
- determining that a sender of the email comprises the particular sender;
- determining that a topic of the email comprises the particular topic; and
- moving the email from the inbox to a trash folder of the email client application.

9. The one or more non-transitory computer-readable media of claim 8, wherein:
- the particular topic comprises at least one of a status update or a change notification.

10. A server comprising:
- one or more processors; and
- one or more non-transitory computer-readable media storing instructions that are executable by the one or more processors to perform operations comprising:
  - selecting an inbox of an email client application associated with an employee in an enterprise;
  - performing, by a classifier, an analysis of stored emails associated with the employee;
  - determining, based at least in part on the analysis, that a particular type of email remains unread in the inbox for more than a predetermined period of time;
  - creating a particular user rule of the one or more user rules to automatically delete the particular type of email after the particular type of email has been received in the inbox; and
  - deleting an email in the inbox based at least in part on:
    - one or more sender rules associated with the email;
    - one or more system rules associated with an email system used by the enterprise;
    - one or more user rules created based on an analysis of user behavior; and
    - one or more data loss prevention (DLP) policies.

11. The server of claim 10, the operations further comprising:
- creating a particular system rule of the one or more system rules to automatically delete a particular email that is classified with a particular classification after a predetermined time interval.

12. The server of claim 11, wherein the particular classification comprises one of a restricted classification, a confidential classification, or a do not forward classification.

13. The server of claim 10, wherein deleting the email in the inbox comprises:
- moving the email from the inbox to a trash folder, the email retrievable from the trash folder.

14. The server of claim 13, further comprising:
- determining that the email has been in the trash folder greater than a predetermined period of time; and
- automatically removing the email from the trash folder, the email unretrievable by the employee after being removed from the trash folder.

* * * * *